May 16, 1961 W. J. WILDERN 2,984,256
GAS VALVE STRUCTURE
Filed March 30, 1959

INVENTOR.
WILLIAM J. WILDERN
BY
Whittemore, Hulbert & Belknap
ATTORNEYS

2,984,256
GAS VALVE STRUCTURE

William J. Wildern, Detroit, Mich., assignor to The Roberts Brass Manufacturing Co., Mitchell, Ind., a corporation of Michigan Filed Mar. 30, 1959, Ser. No. 802,699

3 Claims. (Cl. 137—613)

This invention relates to valve structures in general, and more particularly to a valve structure for controlling the flow of gas through an orifice outlet.

There is need for a single valve structure that can be used with bottled gas and manufactured, natural or mixed gases without any structural changes being made in the valve. It is desirable that such a valve structure be merely adjustable for use with different gas supplying sources and that the adjustment required be one that is accomplished with relative simplicity.

One example of the need for such a valve structure is with gas cooking and heating stoves used in house trailers and the like. The gas stoves are sometimes used with bottled gas and at other times are connected directly to a pipe line supply source. The difference in the gas pressure must be compensated for by the user of the stove in the amount that the gas burner valves are opened. This is most troublesome when the burner valves include indicia of expected openings, which are inaccurate because of the different gas pressure conditions.

It is an object of this invention to provide a valve structure which permits ready adjustment and compensation of the flow of gas through an outlet orifice.

It is an object of this invention to provide such a valve which is usuable with bottled, manufactured, natural or mixed gases without structural change.

It is also an object of this invention to provide a valve structure of the type mentioned and which is relatively simple and inexpensive to manufacture and to provide at a commercially acceptable price.

Another object of this invention is to provide a valve structure having the advantages mentioned and which may be readily inspected and repaired, if necessary, though it is essentially trouble-free once installed for use.

These and other objects and advantages in the practice of this invention will be more fully appreciated upon a reading of the following specification, concerning a working embodiment of the invention, in conjunction with the accompanying drawing in regard thereto.

Figure 1:
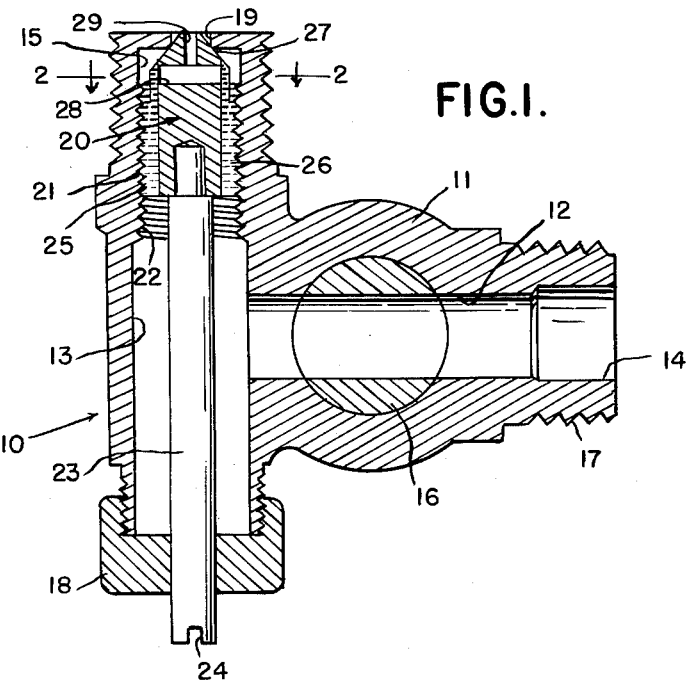
Figure 1 is a cross-sectional plan view of a valve structure including the teachings of this invention.
Figure 2:
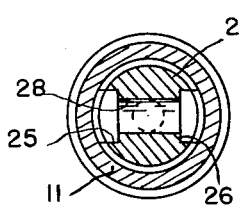
Figure 2 is a radial cross-sectional view of the valve structure shown in the plane of line 2—2 of Figure 1, looking in the direction of the arrows thereon.
Figure 3:
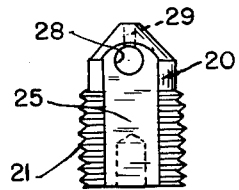
Figure 3 is a side plan view of the valve member used in the valve structure of Figure 1.
Figure 4:
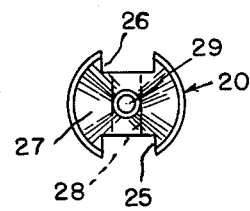
Figure 4 is a top plan view of the valve member shown by Figure 3.

In brief, the valve structure disclosed by the drawing includes a valve body having fluid flow passages formed therethrough. A valve member is threaded within one of the passages for axial adjustment relative to a valve seat also provided therein. The valve member serves as a passage restricting and closing needle type valve and is also formed to provide certain through-flow restricting passages to assure a minimum constant flow of gas through the valve body.

Referring to the drawing in further detail, the valve structure 10 includes a valve body member 11 having fluid flow passages 12 and 13 formed therein. The passages 12 and 13 intersect within the valve body member. Passage 12 provides an inlet end 14 and passage 13 provides an outlet end 15 of the through-flow passageway.

A shutoff valve 16 is provided within the valve body 11 across passage 12, in shown open position. The inlet end of the housing 11 is threaded as at 17 for connection of a source of gas supply (not shown). With the gas supply connected to the valve body member and the shutoff valve 16 open, gas will flow directly into the flow passage 13.

The passage 13 is closed at its lower end by a closure member 18 received in threaded engagement with the valve body member. The other end of the passage 13 is formed to provide an orifice surrounded by an annular valve seat 19. The valve body 11 is threaded externally about the outlet end of passage 13 for connection to a gas using means or further passageway (not shown).

An axially adjustable valve member 20 is provided within passage 13. The valve member is externally threaded, as at 21, and the passage is internally threaded, as at 22, for cooperative engagement. A valve stem 23 is fixed to the valve member 20 and extends axially thereof and through the closure cap 18. The end of the valve operating stem is formed to include a coin slot 24. By turning the valve stem 23 the valve member 20 is readily adjusted axially within the flow passage 13 and relative to the valve seat 19.

A pair of longitudinal, diametrically opposite slots 25 and 26 are milled in the threaded external surface of the valve member to provide passages for gas flow past the valve member. These slots 25 and 26 enable fluid flow externally of the valve member 20 and, as will be appreciated, enable ready cleaning of the passageways formed by the slots when the valve member is removed from the housing or body part 11.

The end of the valve member 20 is generally frustoconical in shape to provide a needle nose type valve end 27. The valve member 20 can be adjusted axially by rotation from an advance position in which the frustoconical end 27 sealingly engages seat 19 in an annular zone to a retracted position spaced from the seat. Except for other flow passages which are about to be described, the seating of the coned end 27 of valve member 20, on the valve seat 19, would close the passages formed by slots 25 and 26.

The other passages just mentioned include a cross bore 28 connecting the passageways formed by the milled slots 25 and 26. The cross bore extends radially through the body of the valve member 20 and is shown as partially within the needle nose end 27 thereof. Another passage 29 is formed axially through the end of the valve member and in terminal communication with the cross bore passage 28. Accordingly passages 28 and 29 provide a through-flow passage past the valve seat 19 which afford a minimum constant flow of gas even when the valve seat and member are engaged.

The passages 28 and 29 are formed of a size suitably restricting gas flow therethrough in accordance with the requirements of a burner connected to bottled gas. When the gas supply system is other than bottled gas, the valve member 20 is backed-off from engagement with the valve seat 19. This enables the gas to flow across the valve seat 19 as well as through the passages 28 and 29. The extent to which the valve member 20 is adjusted is, of course, dependent upon the gas pressure of the supply source.

The valve structure 10 enables readily adjusting the permissible flow of gas to a burner or other device irrespective of the use of bottled gas or manufactured, natural or mixed gases from a pipe line or other supply source.

What I claim as my invention is:

1. A dual purpose gas valve for either of two different kinds of gases; comprising a body member provided with two passages, one having an open end provided with a removable closure and having a closed end provided with a gas discharge orifice, the second passage being a gas supply passage for said one passage and being in open communication therewith intermediate the ends thereof, said second passage having an open inlet end attachable alternately to either of two sources respectively of different kinds of gases, said second passage being provided between said inlet end and said one passage with a shut-off valve, and a single elongated valve member adjustable axially of said one passage at a point between said second passage and said discharge orifice, said valve member having a substantially conical end engageable with and operable to close said discharge orifice to control the flow therethrough of one of said two different kinds of gases, said valve member being provided between said conical end and the other end thereof with two diametrically opposed longitudinal extending open ended slots for receiving either of said two kinds of gases from said second passage, said body member being provided adjacent the closed end of said one passage with internal threads, said valve member being provided between said diametrically opposed slots with external threads meshing with the internal threads aforesaid of said body member and enabling said valve member to be adjusted axially of said body member relative to said discharge orifice, said valve member having an open ended cross bore extending between and terminally in open communication with said diametrically opposed slots, the conical end aforesaid of said valve member having an open ended axial passage in open communication with said cross bore, said axial passage extending outwardly through the apex of said conical end for registration with said discharge orifice when said conical end is in engagement with and closes said discharge orifice.

2. The valve structure defined in claim 1, wherein the removable closure is provided with an opening, and said valve member is provided at said other end thereof with an operating valve stem extending outwardly through said opening and operable from the outside of said removable closure.

3. The valve structure defined in claim 1, wherein the axial passage in the conical end of said valve member is restricted in cross sectional area to limit the flow therethrough of gas supplied thereto from said cross bore.

References Cited in the file of this patent

UNITED STATES PATENTS

| 136,746 | McMahon | Mar. 11, 1873 |
| 1,070,453 | Griffin | Aug. 19, 1913 |
| 2,411,667 | Mowrey | Nov. 26, 1946 |
| 2,720,845 | Whitlock | Oct. 18, 1955 |

FOREIGN PATENTS

| 549,830 | France | Nov. 28, 1922 |